United States Patent
Yang

(10) Patent No.: US 9,226,541 B2
(45) Date of Patent: Jan. 5, 2016

(54) SILICON RUBBER HEALTHCARE FOOTWEAR ARTICLE WITH SILICON RUBBER INSOLE AND ITS MANUFACTURING METHOD

(71) Applicant: Hongguang Yang, Huizhou (CN)

(72) Inventor: Hongguang Yang, Huizhou (CN)

(*) Notice: Subject to any disclaimer, the term of this patent is extended or adjusted under 35 U.S.C. 154(b) by 346 days.

(21) Appl. No.: 13/872,128

(22) Filed: Apr. 28, 2013

(65) Prior Publication Data

US 2014/0317958 A1 Oct. 30, 2014

(51) Int. Cl.
| | |
|---|---|
| *A43B 1/10* | (2006.01) |
| *A43B 1/00* | (2006.01) |
| *A43B 1/14* | (2006.01) |
| *A43B 3/10* | (2006.01) |
| *A43B 7/12* | (2006.01) |
| *B29D 35/02* | (2010.01) |

(52) U.S. Cl.
CPC ... *A43B 1/10* (2013.01); *A43B 1/00* (2013.01); *A43B 1/14* (2013.01); *A43B 3/106* (2013.01); *A43B 7/12* (2013.01); *B29D 35/02* (2013.01)

(58) Field of Classification Search
CPC .......... A43B 1/00; A43B 1/10; A43B 1/0054; A43B 13/18; A43B 13/04; A43B 13/02; A43B 23/0205
USPC .............................................. 36/87, 7.3, 4, 28
See application file for complete search history.

(56) References Cited

U.S. PATENT DOCUMENTS

| | | | | |
|---|---|---|---|---|
| 2,972,593 A * | 2/1961 | Daly | .................... | C08L 21/00 12/142 Q |
| 6,994,913 B1 * | 2/2006 | Niki | .................... | A43B 1/10 428/364 |
| 2005/0165153 A1 * | 7/2005 | Fusamae | .................. | A43B 1/00 524/493 |
| 2007/0141940 A1 * | 6/2007 | Baychar | ............. | A41D 31/0038 442/328 |
| 2010/0199524 A1 * | 8/2010 | Grun | .................... | A43B 1/0054 36/25 |
| 2010/0267919 A1 * | 10/2010 | Ichiryu | ................. | C07F 7/0874 528/25 |
| 2014/0194553 A1 * | 7/2014 | Kok Chong | .............. | A43B 7/36 523/351 |
| 2014/0315768 A1 * | 10/2014 | DeSantis | .............. | C10M 141/06 508/262 |
| 2014/0317957 A1 * | 10/2014 | Yang | ........................ | A43B 9/02 36/87 |
| 2014/0317958 A1 * | 10/2014 | Yang | ........................ | A43B 1/10 36/87 |
| 2015/0079353 A1 * | 3/2015 | Gordon | .................... | A43B 1/08 428/172 |
| 2015/0164175 A1 * | 6/2015 | Katsuya | ................. | A43B 17/00 36/87 |

* cited by examiner

*Primary Examiner* — Marie Bays
(74) *Attorney, Agent, or Firm* — Novoclaims Patent Services LLC; Mei Lin Wong

(57) ABSTRACT

A healthcare footwear article includes an upper shoe body and a sole member provided underneath the upper shoe body and is connected with the upper shoe body to form an integral body. The upper shoe body and the sole member is configured from a material consisting of approximately 70% to approximately 80% of silicon rubber by weight, approximately 5% to approximately 20% of negative ion powder by weight, approximately 2% to approximately 7% of antiwear agent by weight, approximately 5% to approximately 20% of titanium powder by weight, approximately 0.1% to approximately 1.5% of vulcanizing agent by weight, approximately 5% to approximately 10% of infrared ray powder by weight, and approximately 0.1% to approximately 8% of dye by weight.

11 Claims, 3 Drawing Sheets

SILICON RUBBER HEALTHCARE FOOTWEAR ARTICLE WITH SILICON RUBBER INSOLE AND ITS MANUFACTURING METHOD

BACKGROUND OF THE PRESENT INVENTION

1. Field of Invention

The present invention relates to a healthcare footwear article, and more particularly to a healthcare shoe and a manufacturing method thereof.

2. Description of Related Arts

With the increase of living standard of human beings, the demand for high quality footwear is also increasing. For example, people may want their shoes to have certain specific features, such as waterproof feature, wearproof feature, healthcare feature, and the likes. There exist many healthcare shoes all around the world, but the healthcare features of those shoes are usually accomplished by providing some sorts of medicine or complicated mechanical structure in the shoes. This leads to very high cost and selling price for these conventional healthcare shoes. Apart from high manufacturing cost and selling price, the circumstances in which these conventional healthcare shoes can be used tend to be very limited.

On the other hand, the conventional healthcare shoes mentioned above usually comprises an upper shoe body, a sole member, and an insole received in the upper shoe body. Conventionally, the insole is configured from materials which are stiff, hard and have little elasticity. These adverse properties make the wearers of the shoes very uncomfortable, especially when the wearers need to wear the shoes for an extended period of time.

As a result, there is a need to develop a healthcare footwear article, such as a healthcare shoe, which can resolve the above-mentioned problems.

SUMMARY OF THE PRESENT INVENTION

An objective of the present invention is to provide a healthcare footwear article such as a healthcare shoe comprising an upper shoe body and a sole member which are formed as an integral body.

Another object of the present invention is to provide a healthcare footwear article such as a healthcare shoe comprising an insole which has a desirable elasticity and durability for imparting substantial comfort to the wearer of the healthcare shoe.

Another object of the present invention is to provide a healthcare footwear article such as a healthcare shoe which is configured mainly from silicon rubber mixture with a specific composition of matter. Moreover, the insole of the healthcare shoe is also configured from a specific composition of matter.

Another object of the present invention is to provide a method of manufacturing a healthcare footwear article which involves simplified steps as compared with manufacturing procedures for conventional healthcare footwear articles.

In one aspect of the present invention, it provides a healthcare footwear article, comprising:

an upper shoe body; and a sole member provided underneath the upper shoe body and is connected with the upper shoe body to form an integral body, wherein the upper shoe body and the sole member is configured from a material consisting of approximately 70% to approximately 80% of silicon rubber by weight, approximately 5% to approximately 20% of negative ion powder by weight, approximately 2% to approximately 7% of antiwear agent by weight, approximately 5% to approximately 20% of titanium powder by weight, approximately 0.1% to approximately 1.5% of vulcanizing agent by weight, approximately 5% to approximately 10% infrared ray powder by weight, and approximately 0.1% to approximately 8% of dye by weight.

In another aspect of the present invention, it provides a method of manufacturing a footwear article, comprising the steps of:

thoroughly mixing a predetermined amount of silicon rubber, negative ions powder, antiwear powder, titanium powder, vulcanizing agent, infrared ray powder and dye to form a mixture, wherein the mixture consists of approximately 70% to approximately 85% of the silicon rubber by weight, approximately 5% to approximately 20% of the negative ion powder by weight, approximately 2% to approximately 7% of the antiwear agent by weight, approximately 5% to approximately 20% of the titanium powder by weight, approximately 0.1% to approximately 1.5% of the vulcanizing agent by weight, approximately 5% to approximately 10% of infrared ray powder by weight, and approximately 0.1% to approximately 8% of the dye by weight;

removing air bubbles from the mixture;

injecting or pressing the mixture without the air bubbles into a predetermined mold for the healthcare footwear article;

heating the mold to a temperature of approximately 150° C. to 220° C. for approximately 200 seconds to approximately 1500 seconds to form the healthcare footwear article comprising an upper shoe body and a sole member as an integral body; and removing the healthcare footwear article from the mold.

In another aspect of the present invention, it provides a method of manufacturing an insole of a footwear article, comprising the steps of:

thoroughly mixing a predetermined amount of silicon rubber, negative ions powder, titanium powder, vulcanizing agent, infrared ray powder, infrared ray powder and dye to form a mixture, wherein the mixture consists approximately 70% to approximately 90% of silicon rubber by weight, approximately 3% to approximately 23% of negative ion powder by weight, approximately 3% to approximately 23% of titanium powder by weight, approximately 0.1% to approximately 1.5% of vulcanizing agent by weight, approximately 5% to approximately 7% of infrared ray powder by weight, and approximately 0.1% to approximately 8% of dye by weight;

injecting or pressing the mixture into a predetermined mold for the insole;

heating the mold to a temperature of approximately 150° C. to approximately 220° C. for approximately 200 seconds to approximately 1500 seconds to form the main insole body;

removing the main insole body from the mold; and fittedly wrapping an insole cover around the main insole body to form the insole of the healthcare footwear article.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention. Each of the inventive features described below can be used independently of one another or in combination with other features.

Figure 1:
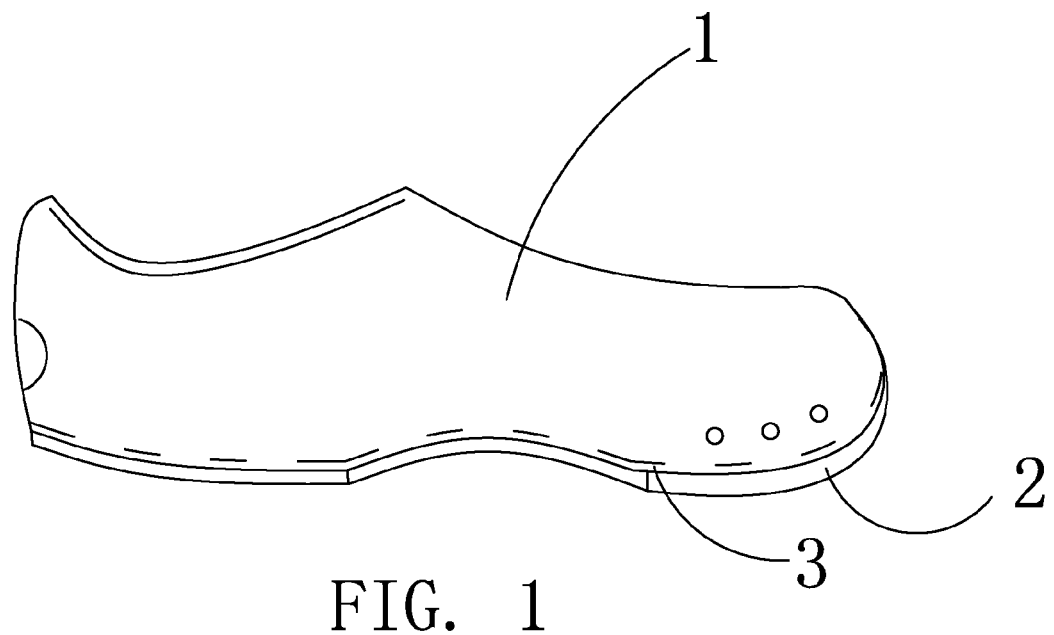
FIG. 1 is a side view of a healthcare footwear article according to a preferred embodiment of the present invention.

Referring to FIG. 1 of the drawings, a healthcare footwear article, such as a healthcare shoe, according to a preferred embodiment of the present invention is illustrated. The healthcare shoe comprises an upper shoe body 1, and a sole member 2 provided underneath the upper shoe body 1. The upper shoe body 1 and the sole member 2 are connected to form an integral body so that a manufacturer of the present invention does not need to separately manufacture the upper shoe body 1 and the sole member 2. The healthcare shoe may be manufactured by injection molding or pressing technology.

The upper shoe body 1 and the sole member 2 are configured from or made by a material consisting of approximately 70% of silicon rubber by weight, approximately 10% of negative ion powder by weight, approximately 6% of antiwear agent by weight, approximately 8% of titanium powder by weight, approximately 0.5% of vulcanizing agent by weight, approximately 5% of infrared ray powder by weight, and approximately 0.5% of dye by weight.

More generically, apart from the above figures, the upper shoe body 1 and the sole member 2 may also be configured from or made by a material consisting of approximately 70% to approximately 85% of silicon rubber by weight, approximately 5% to approximately 20% of negative ion powder by weight, approximately 2% to approximately 7% of antiwear agent by weight, approximately 5% to approximately 20% of titanium powder by weight, approximately 5% to approximately 10% of infrared ray powder by weight, approximately 0.1% to approximately 1.5% of vulcanizing agent by weight, and approximately 0.1% to approximately 8% of dye by weight.

Figure 2:
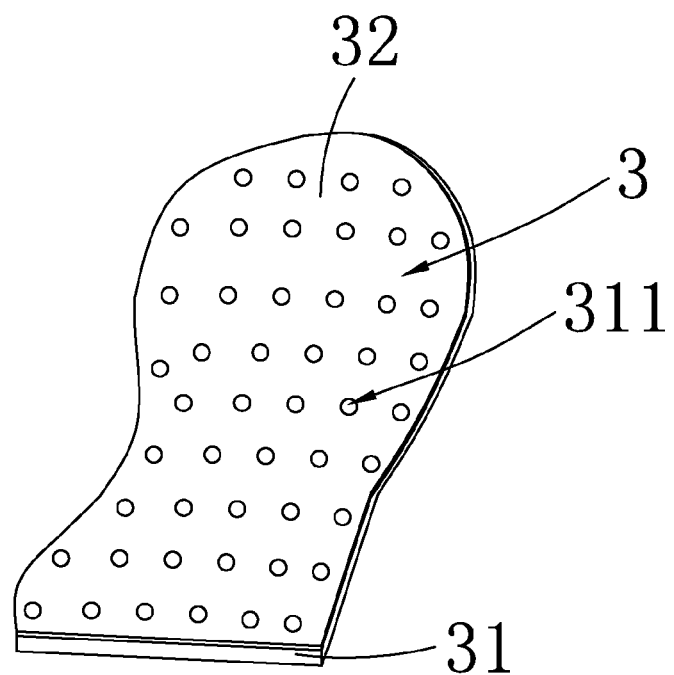
FIG. 2 is a schematic diagram of an insole of the healthcare footwear article according to a preferred embodiment of the present invention.

Referring to FIG. 1 to FIG. 2 of the drawings, the healthcare footwear article such as the healthcare shoe further comprises an insole 3 which comprises a main insole body 31 and an insole cover 32 fittedly covering the main insole body 31 for protection thereof. Specifically, the main insole body 31 is configured from a material consisting of approximately 75% of silicon rubber by weight, approximately 9% of negative ion powder by weight, approximately 10% of titanium powder by weight, approximately 0.5% of vulcanizing agent by weight, approximately 5% of infrared ray powder by weight, and approximately 0.5% of dye by weight. Furthermore, the insole 3 or the main insole body 31 along may have a plurality of ventilating holes 311 formed thereon for ventilation.

The insole cover 32 may be configured from fabric material or leather material which fitedly wraps around the main insole body 31 for protection thereof. The insole 3 is normally placed in the healthcare shoe for imparting optimal comfort to the wearer thereof. Note that the material used to manufacture the main insole body 31 mainly consists of silicon rubber. As a result, the main insole body 31 will have better elasticity and softness as compared to conventional insoles. A thickness of the insole 3 is approximately 0.5 mm to approximately 10 mm. Note that the insole 3 can also be used while the insole cover 32 is absent.

More generically, apart from the above percentages figures for the material configuring the insole 3, it may also be configured from or made by a material consisting of approximately 70% to approximately 90% of silicon rubber by weight, approximately 3% to approximately 23% of negative ion powder by weight, approximately 3% to approximately 23% of titanium powder by weight, approximately 0.1% to approximately 1.5% of vulcanizing agent by weight, approximately 5% to approximately 7% of infrared ray powder by weight, and approximately 0.1% to approximately 8% of dye by weight.

Figure 3:
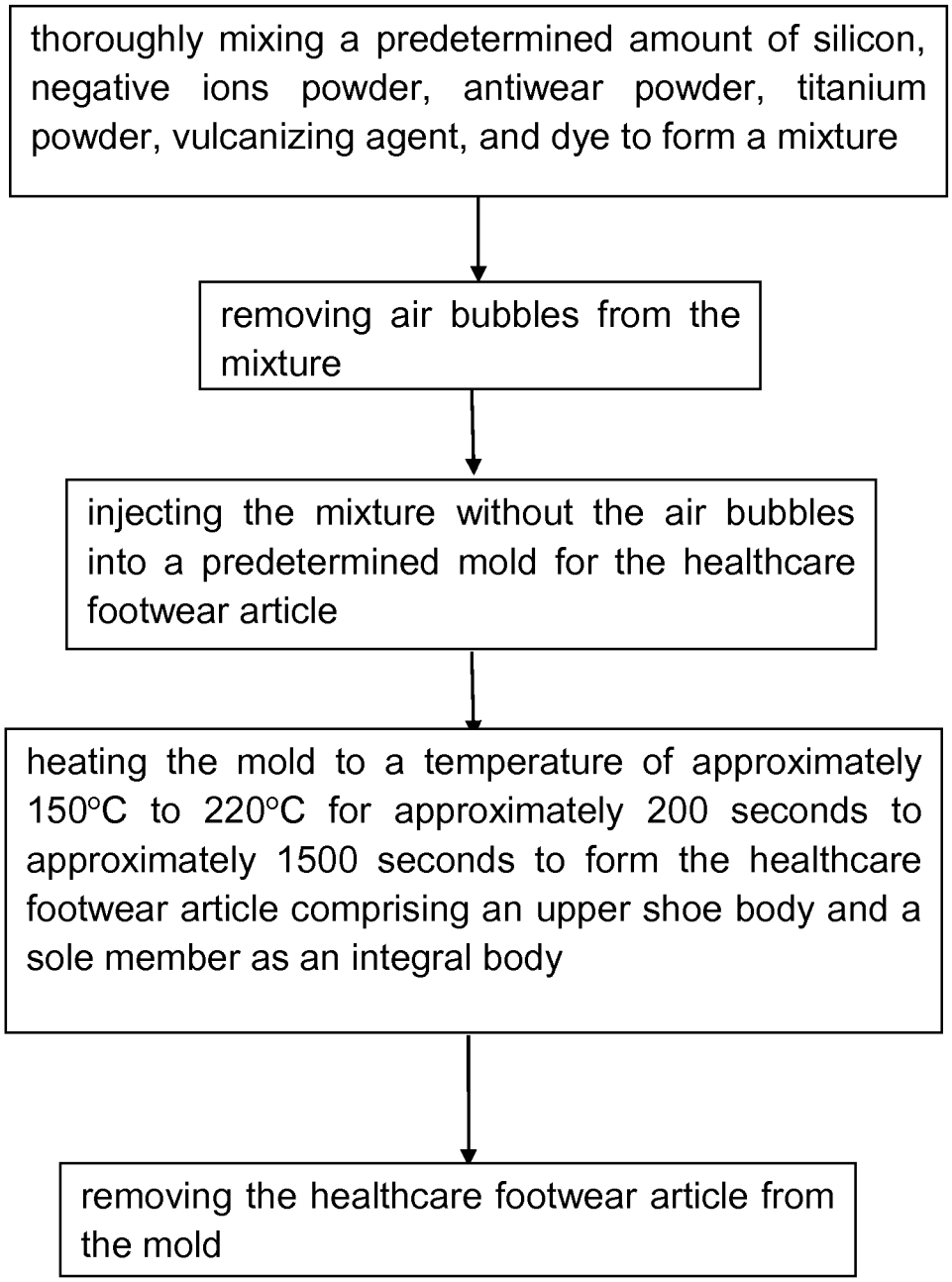
FIG. 3 is a flow chart illustrating a method of manufacturing the healthcare footwear article according to the preferred embodiment of the present invention.

Referring to FIG. 3 of the drawings, a method of manufacturing a healthcare footwear article according to the preferred embodiment of the present invention is illustrated. The method comprises the steps of:

thoroughly mixing a predetermined amount of silicon rubber, negative ions powder, antiwear powder, titanium powder, vulcanizing agent, infrared ray powder, and dye to form a mixture, wherein the mixture consists of approximately 70% of silicon rubber by weight, approximately 10% of negative ion powder by weight, approximately 6% of antiwear agent by weight, approximately 8% of titanium powder by weight, approximately 0.5% of vulcanizing agent by weight, approximately 5% of infrared ray powder by weight, and approximately 0.5% of dye by weight;

removing air bubbles from the mixture; and injecting or pressing the mixture without air bubbles into a predetermined mold for the healthcare footwear article;

heating the mold to a temperature of approximately 150° C. to 220° C. for approximately 200 seconds to approximately 1500 seconds to form the healthcare footwear article comprising the upper shoe body 1 and the sole member 2 as an integral body; and removing the healthcare footwear article from the mold.

Figure 4:
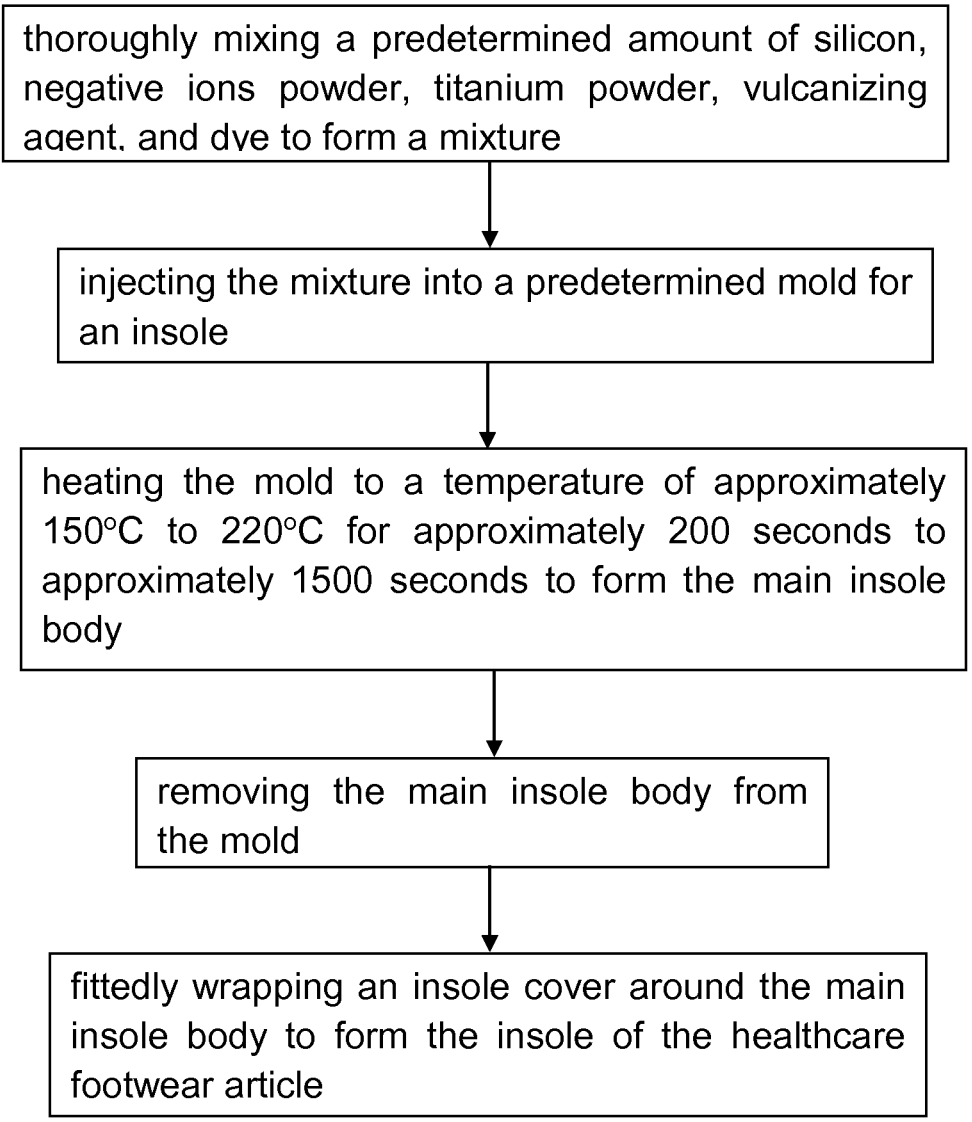
FIG. 4 is a flow chart illustrating a method of manufacturing the insole of the healthcare footwear article according to the preferred embodiment of the present invention.

Referring to FIG. 4 of the drawings, a method of manufacturing the insole 3 of the healthcare footwear article according to the preferred embodiment of the present invention is illustrated. The method comprises the steps of:

thoroughly mixing a predetermined amount of silicon rubber, negative ions powder, titanium powder, vulcanizing agent, infrared ray powder and dye to form a mixture, wherein the mixture consists of approximately 75% of silicon rubber by weight, approximately 9% of negative ion powder by weight, approximately 10% of titanium powder by weight, approximately 0.5% of vulcanizing agent by weight, approximately 5% of infrared ray powder by weight, and approximately 0.5% of dye by weight.

injecting the mixture into a predetermined mold for the insole;

heating the mold to a temperature of approximately 150° C. to approximately 220° C. for approximately 200 seconds to approximately 1500 seconds to form the main insole body 31 having the ventilating holes 311; and removing the main insole body 3 from the mold; and fittedly wrapping the insole cover 32 around the main insole body 3 to form the insole 3 of the healthcare footwear article.

Note that the ventilating holes 311 can also be formed after the main insole body 31 has been removed from the mold. Moreover, the ventilating holes 311 can also be formed on the entire insole 3. That is, the main insole body 31 and the insole cover 32. Moreover, the insole 3 can also be used while the insole 3 does not have the insole cover 32.

As shown in the above disclosure, the healthcare footwear article of the present invention such as the healthcare shoe described above can be easily manufactured by injection molding or pressing technology as the final product forms an integral body so as to ensure the maximum structural integrity of the healthcare footwear article. Since the entire healthcare footwear article is made from silicon rubber based material, it is waterproof, easy to clean and generally less vulnerable to acidic environment. Since the material for configuring the healthcare footwear article and the insole 3 consist of a predetermined amount of negative ions powder, the healthcare footwear article of the present invention may release negative ions to foster blood circulation and metabolism of the wearer.

The present invention, while illustrated and described in terms of a preferred embodiment and several alternatives, is not limited to the particular description contained in this specification. Additional alternative or equivalent components could be used to practice the present invention.

What is claimed is:

1. A healthcare footwear article, comprising:
   an upper shoe body; and
   a sole member provided underneath said upper shoe body and is connected with said upper shoe body to form an integral body, wherein said upper shoe body and said sole member is configured from a material consisting of approximately 70% to approximately 85% of silicon rubber by weight, approximately 5% to approximately 20% of negative ion powder by weight, approximately 2% to approximately 7% of antiwear agent by weight, approximately 5% to approximately 20% of titanium powder by weight, approximately 0.1% to approximately 1.5% of vulcanizing agent by weight, approximately 5% to approximately 10% of infrared ray powder by weight, and approximately 0.1% to approximately 8% of dye by weight.

2. The healthcare footwear article, as recited in claim 1, wherein said upper shoe body and said sole member are configured from a material consisting of approximately 70% of silicon rubber by weight, approximately 10% of negative ion powder by weight, approximately 6% of antiwear agent by weight, approximately 8% of titanium powder by weight, approximately 0.5% of vulcanizing agent by weight, approximately 5% of infrared ray powder by weight, and approximately 0.5% of dye by weight.

3. The healthcare footwear article, as recited in claim 1, further comprising an insole which comprises a main insole body and an insole cover fittedly covering the main insole body for protection thereof, wherein said main insole body has a plurality of ventilating holes formed thereon for ventilation.

4. The healthcare footwear article, as recited in claim 2, further comprising an insole which comprises a main insole body and an insole cover fittedly covering the main insole body for protection thereof, wherein said main insole body has a plurality of ventilating holes formed thereon for ventilation.

5. The healthcare footwear article, as recited in claim 3, wherein said main insole body is configured from a material consisting of approximately 70% to approximately 90% of silicon rubber by weight, approximately 3% to approximately 23% of negative ion powder by weight, approximately 3% to approximately 23% of titanium powder by weight, approximately 0.1% to approximately 1.5% of vulcanizing agent by weight, approximately 5% to approximately 7% of infrared ray powder by weight, and approximately 0.1% to approximately 8% of dye by weight.

6. The healthcare footwear article, as recited in claim 4, wherein said main insole body is configured from a material consisting of approximately 70% to approximately 90% of silicon rubber by weight, approximately 3% to approximately 23% of negative ion powder by weight, approximately 3% to approximately 23% of titanium powder by weight, approximately 0.1% to approximately 1.5% of vulcanizing agent by weight, and approximately 0.1% to approximately 8% of dye by weight.

7. The healthcare footwear article, as recited in claim 5, wherein said main insole body is configured from a material consisting of approximately 75% of silicon rubber by weight, approximately 9% of negative ion powder by weight, approximately 10% of titanium powder by weight, approximately 0.5% of vulcanizing agent by weight, approximately 5% of infrared ray powder by weight, and approximately 0.5% of dye by weight.

8. The healthcare footwear article, as recited in claim 6, wherein said main insole body is configured from a material consisting of approximately 75% of silicon rubber by weight, approximately 9% of negative ion powder by weight, approximately 10% of titanium powder by weight, approximately 0.5% of vulcanizing agent by weight, approximately 5% of infrared ray powder by weight, and approximately 0.5% of dye by weight.

9. The healthcare footwear article, as recited in claim 4, wherein a thickness of said insole is approximately 0.5 mm to approximately 10 mm.

10. The healthcare footwear article, as recited in claim 6, wherein a thickness of said insole is approximately 0.5 mm to approximately 10 mm.

11. The healthcare footwear article, as recited in claim 8, wherein a thickness of said insole is approximately 0.5 mm to approximately 10 mm.

* * * * *